(12) United States Patent
Escribano Bullon et al.

(10) Patent No.: US 8,818,942 B2
(45) Date of Patent: Aug. 26, 2014

(54) DATABASE SYSTEM WITH MULTIPLE LAYER DISTRIBUTION

(75) Inventors: Berta Isabel Escribano Bullon, Madrid (ES); Alfredo Gonzalez Plaza, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 756 days.

(21) Appl. No.: 12/670,198

(22) PCT Filed: Jul. 23, 2007

(86) PCT No.: PCT/EP2007/057566
§ 371 (c)(1),
(2), (4) Date: May 26, 2010

(87) PCT Pub. No.: WO2009/012810
PCT Pub. Date: Jan. 29, 2009

(65) Prior Publication Data
US 2010/0257137 A1    Oct. 7, 2010

(51) Int. Cl.
G06F 17/30    (2006.01)
G06F 17/00    (2006.01)

(52) U.S. Cl.
CPC .............................. *G06F 17/30581* (2013.01)
USPC ........... 707/620; 707/629; 707/687; 707/652; 707/770; 707/623

(58) Field of Classification Search
None
See application file for complete search history.

(56) References Cited

U.S. PATENT DOCUMENTS 6,523,032 B1 *   2/2003   Sunkara et al. ..................... 1/1
7,185,121 B2 *   2/2007   Fitzsimmons et al. .......... 710/26
7,353,311 B2 *   4/2008   Murdock et al. ............... 710/244
7,917,495 B1 *   3/2011   Chapman et al. .............. 707/713
2002/0161836 A1 * 10/2002 Hosomi ......................... 709/203
2004/0196872 A1 * 10/2004 Nakamura ..................... 370/512
2005/0065801 A1 *  3/2005 Poikselka et al. ................. 705/1
2006/0200533 A1 *  9/2006 Holenstein et al. ........... 709/208
2008/0049691 A1 *  2/2008 Pulikonda ..................... 370/338
2008/0096550 A1 *  4/2008 Mandelin ...................... 455/425

OTHER PUBLICATIONS

International Search Report for PCT/EP2007/057566, filed Nov. 26, 2007.
International Preliminary Report on Patentability with Amended Sheets for PCT/EP2007/057566, mailed Oct. 30, 2009.
Huican, Z. et al., "A scheduling Framework for Web Server Clusters with Intensive Dynamic Content Processing", Technical Report TRCS-98-29, [Online], (Nov. 1998), pp. 1-23.

(Continued)

*Primary Examiner* — Alicia Lewis
(74) *Attorney, Agent, or Firm* — Nixon & Vanderhye, P.C.

(57) ABSTRACT

Method and system for accessing subscriber data in a telecommunication system, and providing a database system with a master database and slave databases acting as memory caches located with requester applications. The method including: configuring data clusters at the master database, each data cluster identifying subscriber data associated with an operation and assigned a priority; determining at the master database the priority of the data cluster associated with a received operation; and either providing the data cluster associated with the operation from the master database towards the slave database, replicating the received data cluster at the slave database, and executing the operation with the received data cluster at the slave database, where the priority of the data cluster is higher than for previous operations; or executing the operation with the data cluster at the master database, where the priority of the data cluster is lower than for a previous operation.

25 Claims, 7 Drawing Sheets

(56) References Cited

OTHER PUBLICATIONS

Plattner, C. et al., "Ganymed: scalable replication for transactional Web applications", Lecture Notes in Computer Science, vol. 3231, (2004), pp. 155-174.

Miguel Barreiro et al., "Exploiting Sequential Libraries on a Cluster of Computers", Proc. of the Erlang Workshop 2001, [Online], (Sep. 2001), pp. 1-8.

* cited by examiner

| Client Application | Priority | Data Cluster |
|---|---|---|
| Application-1 | 7 | 1 |
| Application-1 | 6 | 2 |
| Application-2 | 5 | 1 |
| Application-2 | 6 | 2 |
| ... | ... | ... |

FIG.-3a-

| Slave DB | Priority | Data Cluster |
|---|---|---|
| slave DB-2 | 7 | 1 |
| slave DB-1 | 6 | 2 |
| ... | ... | ... |

FIG.-3b-

| Client Application | Slave DB | Priority | Data Cluster |
|---|---|---|---|
| Application-1 | slave DB-2 | 7 | 1 |
| Application-1 | slave DB-1 | 6 | 2 |
| Application-1 | slave DB-2 | 5 | 2 |
| Application-1 | slave DB-1 | 3 | 1 |
| Application-2 | slave DB-2 | 5 | 1 |
| Application-2 | slave DB-1 | 6 | 2 |
| ... | ... | ... | ... |

| Slave DB | Priority |
|---|---|
| slave DB-2 | 7 |
| slave DB-1 | 6 |
| ... | ... |

104    102

| Data Cluster |
|---|
| 1 |
| 2 |
| ... |

… 
DATABASE SYSTEM WITH MULTIPLE LAYER DISTRIBUTION

This application is the U.S. national phase of International Application No. PCT/EP2007/057566 filed 23 Jul. 2007, which designated the U.S., the entire contents of which is hereby incorporated by reference.

TECHNICAL FIELD

The technology disclosed herein generally relates to database systems and, in particular, to database systems with a plurality of databases distributed in different locations and accessible by different applications.

BACKGROUND

Regarding database technologies, the concept of distributed databases has been widely spread for some time in order to address scalability issues. A distributed database may be regarded as a plurality of databases physically or logically distributed, likely under control of a central database management system, and wherein storage devices are not all necessarily attached to a common CPU. Thus, the distributed database might be built up with multiple computers located in the same physical location, or may be dispersed over a network of interconnected computers. Generally speaking, the distribution of databases instances is not necessarily a consequence of data distribution itself but also for the purpose of data replication in order to obtain high available systems.

Where considering a database system distributed in different physical locations, one has to take into account the different nature of the applications allowed to access such database system in terms of its connections to particular database instances and respective distances, as well as in terms of the data distribution amongst said particular database instances. In this respect, and depending on particular models of data distribution to apply, one may distinguish between local applications, which are connected to a specific database instance having all required data and which do not required data from remote database instances, and global applications, which is connected to any database instances and which requires data from remote database instances.

Even where local and global applications concurrently coexist to access the distributed database system, and particularly where the local and global applications carry out communication functions between network nodes of a telecommunication network, the distributed database system is generally required to accomplish: a transparent distribution, so that the applications interact with the distributed database system as if it were one compact logical system; and transparent transactions, so that each transaction maintains a database integrity across the plurality of distributed databases.

The transparent distribution, where the plurality of databases is distributed in different locations, requires a similar performance for local applications requesting data from a closely located database and for global applications requesting data from a far away located database. This is achieved in a traditional distributed database system by the usage of memory caches in areas closely located with the requester applications. Each memory cache temporary saving data usable by the closely located applications.

On the other hand, where memory caches are provided in areas closely located with the requester applications, the integrity of the database system to be maintained by each transparent transaction, as one compact logical system, requires an updating of all the memory caches each time a transaction modifies data in any particular memory cache.

In other words, where a database system with a two-layer distribution is provided, that is, with a master database, which may be distributed in a number of database instances or just being a centralized instance, and with a plurality of slave databases acting as memory caches and provided in areas closely located with the requester applications, there is a need for a sort of cache management logic that takes care about managing data in the slave databases, managing consistency between cached data in the slave databases and master data in the master database, and managing consistency between different caches in different instances of the slave database.

Nowadays, different mechanisms are known to address these three previous issues. For instance, the issue of managing data to be cached in the slave database may be addressed by cache algorithms like a so-called "Least Recently Used", a so-called "Least Frequently Used", and the like; whereas managing consistency between cached data in the slave databases and master data in the master database, as well as between different caches in different instances of the slave database, may be addressed by cache coherence models. Regarding the cache coherence models, the most widely known are the so-called "directory-based", "snooping" and "snarfing". These tree models, where applied to the two-layer DB architecture presented above, have different consequences.

Regarding the directory-based cache coherence model, there is a directory entry for each data block to be cached which contains information about the caching state of the data block in the system, and the locations of the slave database caching said data block. By checking the state and the locations, one can determine which instances of the slave database need to be updated for an operation in order to maintain coherence.

Regarding the snooping cache coherence model, at each slave database location, there is a monitor that is aware about changes in data cached in other locations of the slave database. Where these changes take place, the monitor removes the cache data.

Regarding the snarfing cache coherence model, at each slave database location, there is a monitor that is aware of changes in the master database and the monitor updates the cached data where there is a change in the master database.

These three models, and corresponding implementation mechanisms, are very inefficient where the distributed database system is used in a Wide Area Network (hereinafter WAN) and is shared in a telecommunication system by a number of possibly different subscriber register front-ends, such as Home Subscriber Server (HSS) front-ends and Home Location Register (HLR) front-ends may be. In such scenario, the distributed database system is expected to provide almost real time responses as well as real time coherence whilst the slave database locations are geographically separated by long distances, however, the WAN delays adversely affect continuous replications and updates.

SUMMARY

The technology disclosed herein is aimed to obviate at least some of the above disadvantages and provides for a database system with a master database and a plurality of slave databases to act as memory caches, each slave database connected with a number of applications allowed to request execution of an operation to the database system, and for a method of handling subscriber data in said database system. The database system and the method incorporating features to allow effective replication and updating mechanisms where applied in a WAN and shared in a telecommunication system such as a cellular network or an IP Multimedia Subsystem (hereinafter IMS) network.

Thus, in accordance with a first aspect of the technology disclosed herein, there is provided a method of handling subscriber data in a database system with a master database and with a plurality of slave databases intended to act as memory caches, wherein each slave database is connected with a number of applications allowed to request execution of an operation to the database system. This method comprises the conventional steps of receiving an operation request for a given subscriber from an application, and returning the execution result towards the requester application.

The method also includes, in accordance with this first aspect of the technology disclosed herein a step of configuring so-called data clusters at the master database, wherein each data cluster identifies a number of subscriber data associated with an operation and each data cluster is assigned a priority per slave database, per application, or per combinations thereof; a step of determining at the master database the priority of the data cluster associated with the received operation; and either the steps of providing the data cluster associated with the operation from the master database towards the slave database, replicating the received data cluster at the slave database, and executing the operation with the received data cluster at the slave database, where the priority of the data cluster is higher than for previous operations; or the step of executing the operation with the data cluster at the master database, where the priority of the data cluster is lower than for a previous operation.

Regarding the priority assigned to each data cluster, the method may comprise a further step of dynamically updating the priority assigned to the data cluster, the update based on accountability of successful or unsuccessful movements of the data cluster from one slave database to one another and reaching a predefined threshold value for the successful or unsuccessful movement. This step is useful where a fine tune is fetched to accommodate each replicated data cluster in the most suitable slave database.

In particular, where the data cluster had been replicated in other slave database for a previous operation, the method may include a step of instructing the previous slave database the removal of a data cluster where the priority of the data cluster at said slave database is lower than for a new operation. Moreover, where the data cluster is modified as a result of executing the operation at the slave database, the step of executing the operation with the received data cluster may include a step of updating the master database with the modified data cluster. Furthermore, where the data cluster is modified as a result of executing the operation at the master database, the step of executing the operation with the data cluster at the master database may include a step of updating another slave database with the modified data cluster.

This method is particularly advantageous where the step of receiving the operation request for a given subscriber is carried out at a slave database connected with the application, since the slave databases are preferably located in a location close to the requester applications. In such a case, and even more advantageously where the method further includes a step of determining that no data cluster associated with the operation exists at the slave database, the method may further include a step of sending the operation request for the given subscriber from the slave database towards the master database.

The method may include alternative steps to the step of sending the operation request towards the master database. In this respect, the method may include an additional step of configuring data clusters at the slave database, wherein each data cluster identifies a number of subscriber data associated with the operation; and, additionally, the method may further include a step of requesting a data cluster associated with the operation request for the given subscriber from the slave database towards the master database.

On the one hand, the step of returning the execution result towards the requester application, in this method, may be carried out at the slave database connected with the application. On the other hand, this step of returning the execution result towards the requester application may include a step of returning the result from the master database to the slave database and a step of returning the result from the slave database towards the requester application.

The method may be applicable in a database system having a unique centralized master database as well as in a database system wherein the master database comprises a plurality of interconnected cooperating databases. For the latter, the method may further comprise a step of determining a first cooperating database in charge of the data cluster, and a step of providing either the data cluster or the result of executing the operation towards a slave database through a second cooperating database.

In accordance with a second aspect of the technology disclosed herein, there is provided a database system storing subscriber data for subscribers of a telecommunication network, and comprising: a master database; a plurality of slave databases to act as memory caches, each slave database connected with a number of applications allowed to request execution of an operation to the database system; a receiver for receiving an operation request for a given subscriber from an application; and a sender for returning the execution result towards the requester application.

In this database system, the master database and the plurality of slave databases are improved in accordance with this second aspect of the technology disclosed herein to accomplish the above method.

Thus, the master database includes a configuration unit for configuring data clusters, each data cluster identifying a number of subscriber data associated with an operation and assigned a priority per slave database, application, or combinations thereof; a memory module for storing data cluster values per subscriber basis; a processing unit for determining the priority of the data cluster associated with the operation, and for executing the operation with the data cluster where the priority of the data cluster is lower than for a previous operation; and a sender for providing the data cluster associated with the operation towards the slave database where the priority of the data cluster is higher than for previous operations. Apart from that, each slave database includes a memory module for replicating a number of data clusters from the master database; a receiver for receiving the data cluster associated with the operation from the master database; and a processing unit for executing the operation with the received data cluster.

Regarding the priority assigned to each data cluster, the processing unit of the master database in cooperation with the configuration unit may be arranged for dynamically updating the priority assigned to the data cluster. This update may be based on accountability of successful, or unsuccessful, movements of the data cluster from one slave database to one another and reaching a predefined threshold value for the successful, or unsuccessful, movement.

In particular, where the data cluster had been replicated in other slave database for a previous operation, the processing unit of the master database in cooperation with the sender may be arranged for instructing a slave database the removal of a data cluster where the priority of the data cluster at the slave database is lower than for a new operation, and the processing unit of the slave database in cooperation with the receiver may be arranged for removing said data cluster from the memory module at the slave database. Moreover, where the data cluster is modified as a result of executing the operation at the slave database, the processing unit in cooperation with a sender of the slave database may be arranged for submitting an update towards the master database with the modified data cluster, and the processing unit of the master database in cooperation with the receiver is arranged for updating said data cluster in the memory module. Furthermore, where the data cluster is modified as a result of executing the operation at the master database, the processing unit of the master database in cooperation with the sender is arranged for submitting an update towards a slave database, and the processing unit of each slave database in cooperation with the receiver is arranged for updating said data cluster in the memory module.

As advantageous as for the above method, the receiver of each slave database may be arranged for receiving the operation request for a given subscriber from the application, since the slave databases are preferably located in a location close to the requester applications. In such a case, and even more advantageously where the processing unit of each slave database is arranged for determining that no data cluster associated with the operation exists in the memory module at the slave database, each slave database may include a sender for sending the operation request for the given subscriber towards the master database, and the master database may further include a receiver for receiving said operation request.

Alternatively to the sending of the operation request towards the master database, each slave database may include a configuration unit for configuring data clusters at the slave database, each data cluster identifying a number of subscriber data associated with the operation. In this case, each slave database may include a sender for requesting a data cluster associated with the operation request for the given subscriber towards the master database.

Regarding the return of the execution result towards the requester application, each slave database may include the sender for returning the execution result towards the requester application. On the other hand, the sender of the master database may be arranged for returning the execution result towards the slave database, the receiver of the slave database may be arranged for receiving said result, and the sender of the slave database may be arranged for returning said result towards the requester application.

This database system may be provided with an arrangement having a unique centralized master database as well as with an arrangement having a plurality of interconnected cooperating databases where data clusters may be distributed. In the latter arrangement, the sender of each cooperating database may be arranged for providing either the data cluster or the result of executing the operation towards the slave database directly of through another cooperating database.

In accordance with a third aspect of the technology disclosed herein, the database system described above is usable in a sort of data layered architecture and can be shared amongst a number of front-end servers to provide external communications towards other entities in a telecommunication network.

For instance, a Home Location Register (hereinafter HLR) holding subscriber data for subscribers of a GSM network, may comprise a front-end server for external communications and the above database system, in accordance with the second aspect of the technology disclosed herein, for storing the subscriber data for said subscribers.

Also for instance, a Home Subscriber Server (hereinafter HSS) holding subscriber data for subscribers of an IP Multimedia Subsystem (hereinafter IMS) network, may comprise a front-end server for external communications and the above database system, in accordance with the second aspect of the technology disclosed herein, for storing the subscriber data for said subscribers.

The technology disclosed herein may be practised by one or more computer programs, which may be loadable into an internal memory of a computer with input and output units and with a processing unit, the one or more computer programs comprising executable software, which may be separable in different portions, adapted to carry out the above method steps in the above different entities, server or devices, when running in a number of computers. In particular, the executable software, or portions thereof, may be recorded in a carrier readable medium.

BRIEF DESCRIPTION OF THE DRAWINGS

The features, objects and advantages of the technology disclosed herein will become apparent by reading this description in conjunction with the accompanying drawings, in which.

DETAILED DESCRIPTION

Figure 1:
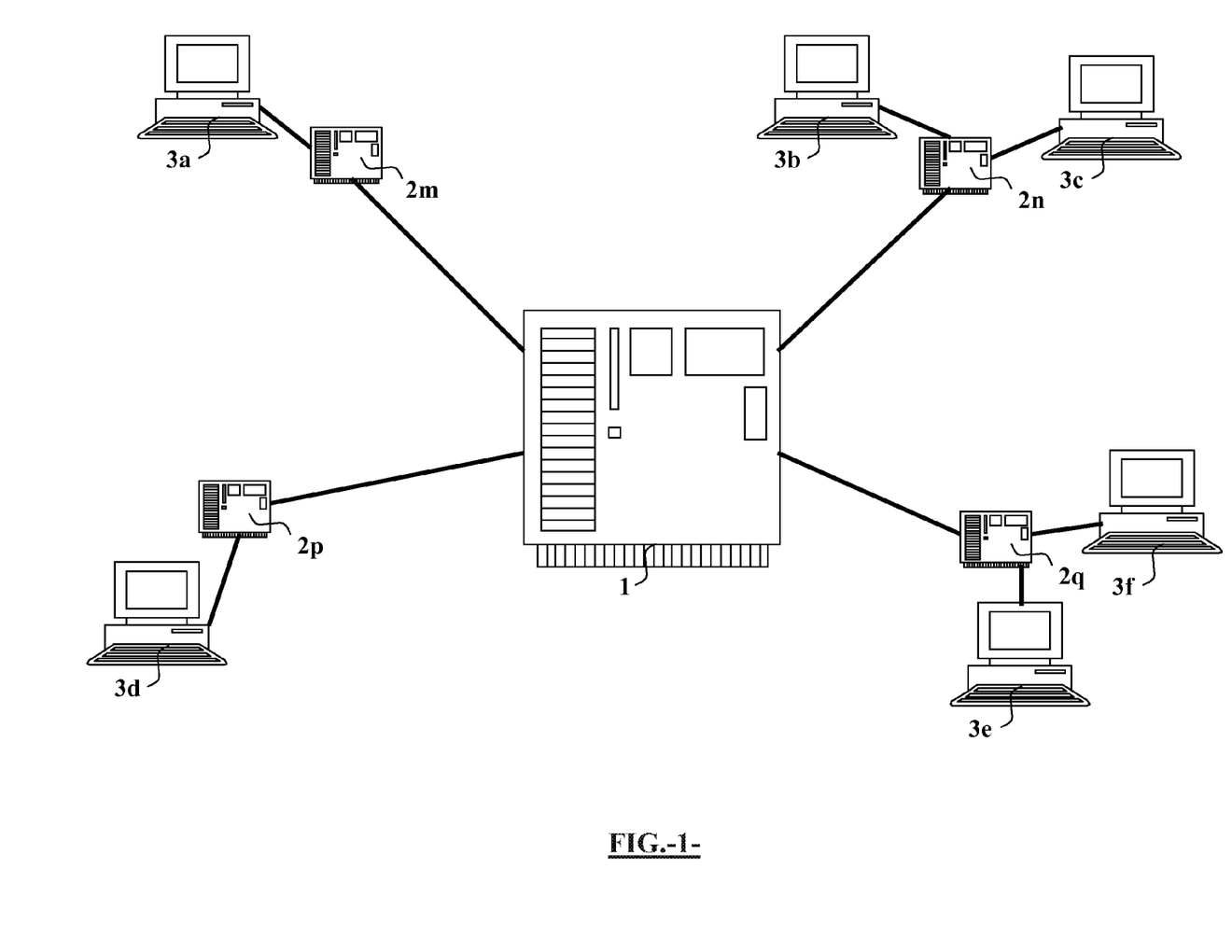
FIG. 1 is a basic block diagram illustrating a database system having a centralized master database and a plurality of slave databases closely located to a number of applications connected to said slave databases.
Figure 2:
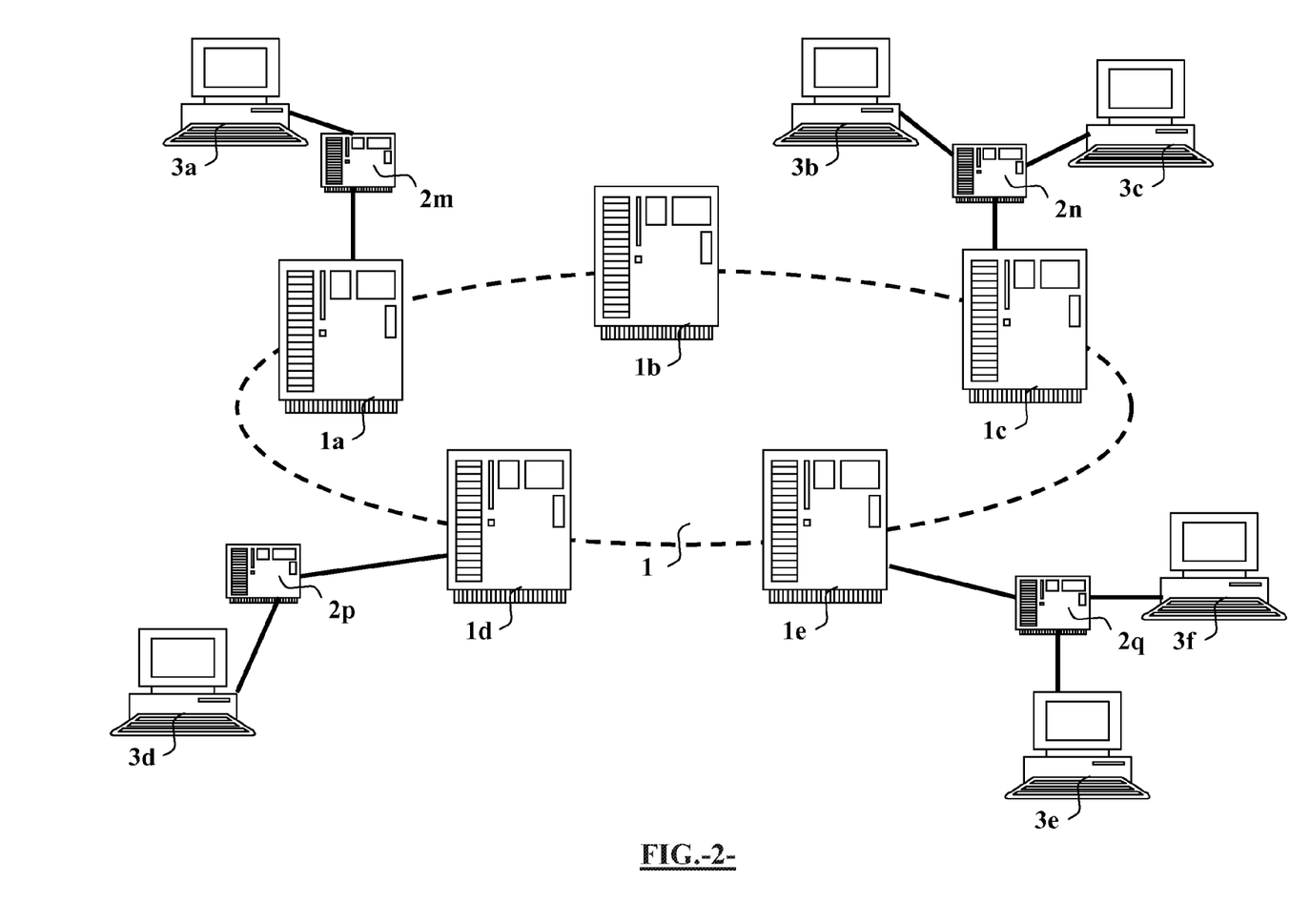
FIG. 2 is a basic block diagram illustrating a database system having a number of cooperating databases acting as a master database, and a plurality of slave databases closely located to a number of applications connected to said slave databases.
Figure 7:
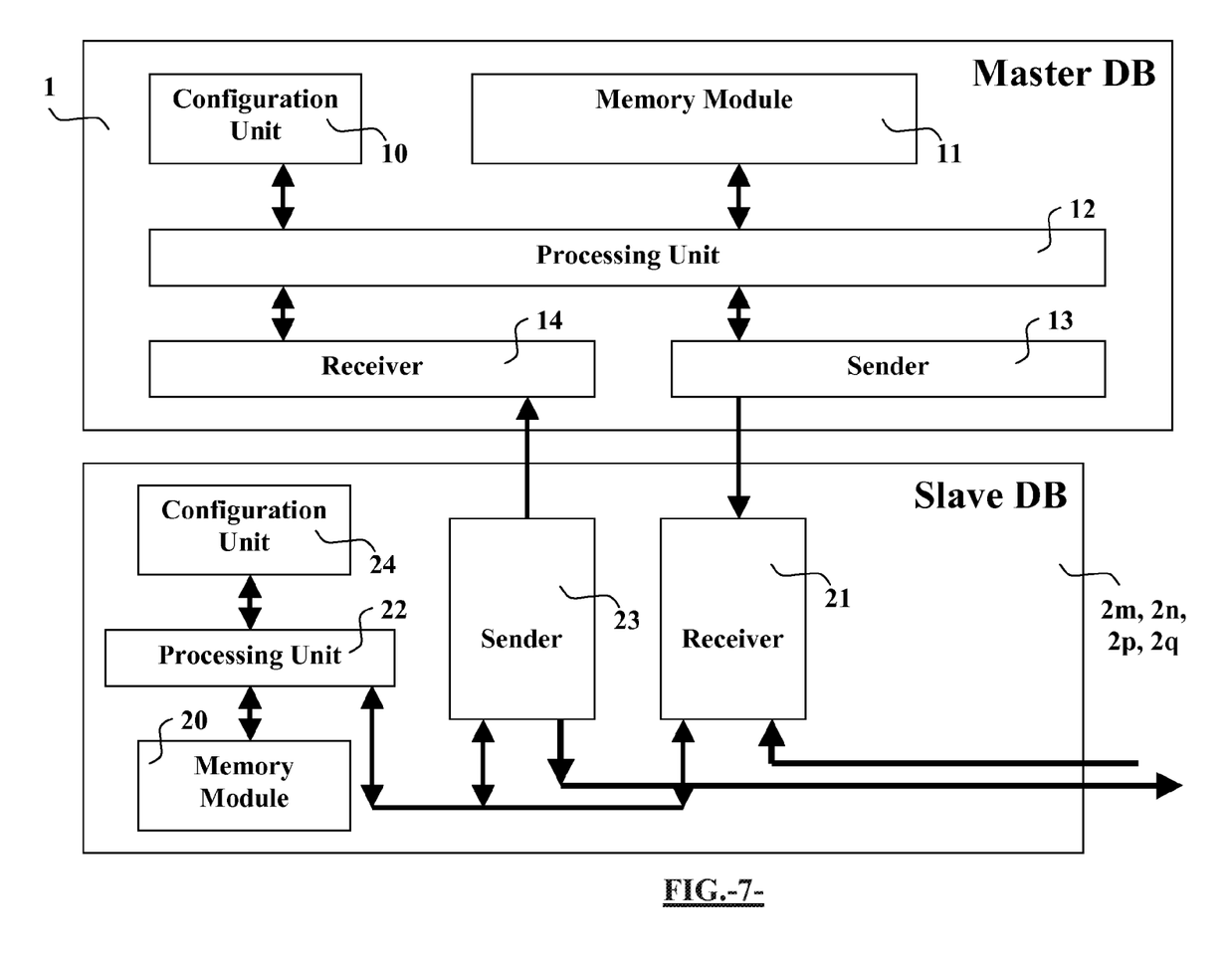
FIG. 7 is a basic block structure presenting the structural elements that a master database and a slave database may comprise in accordance with several embodiments of the technology disclosed herein.

The following describes some preferred embodiments for a method of handling subscriber data in a database system with a master database 1 and with a plurality of slave databases 2m, 2n, 2p, 2q to act as memory caches, as illustrated in FIG. 1 and FIG. 2, each slave database connected with a number of applications 3a, 3b, 3c, 3d, 3f allowed to request execution of an operation to the database system; as well as embodiments of the database system illustrated in FIG. 7.

An important aspect behind this technology disclosed herein is the configuration of subscriber data as data clusters, wherein each data cluster represents an optimal amount of subscriber data associated with each particular operation to be requested from any application. The level of granularity selected for each data cluster is another important aspect for the purpose of the technology disclosed herein and can, nevertheless, be adjusted during operation based on different performance measures obtained with previous values.

Figure 3A:
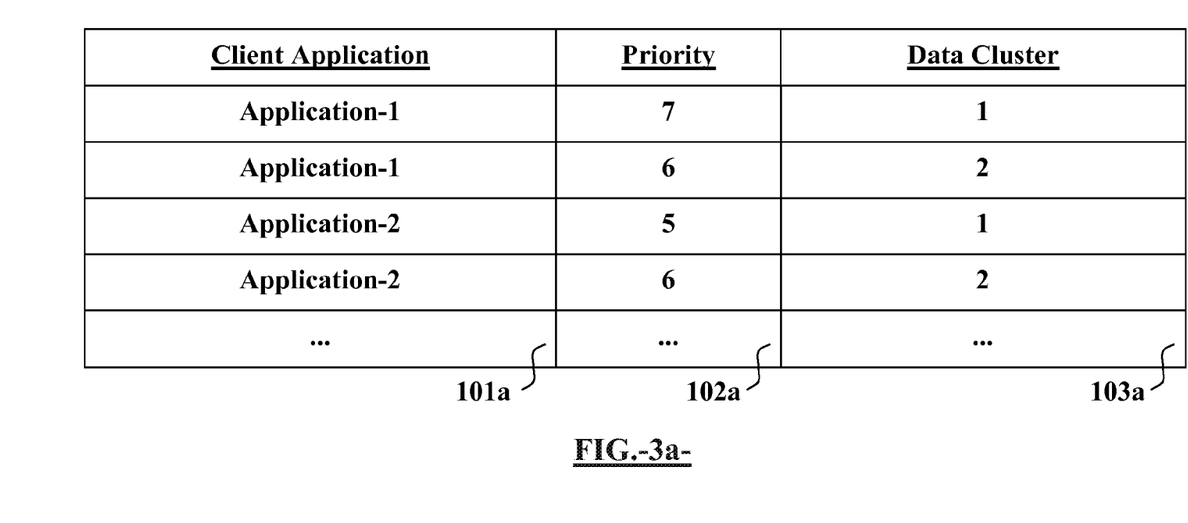
FIGS. 3a, 3b and 3c illustrate alternative embodiments for assigning a priority to data clusters per slave database, application requesting an operation, and combinations thereof.
Figure 3B:
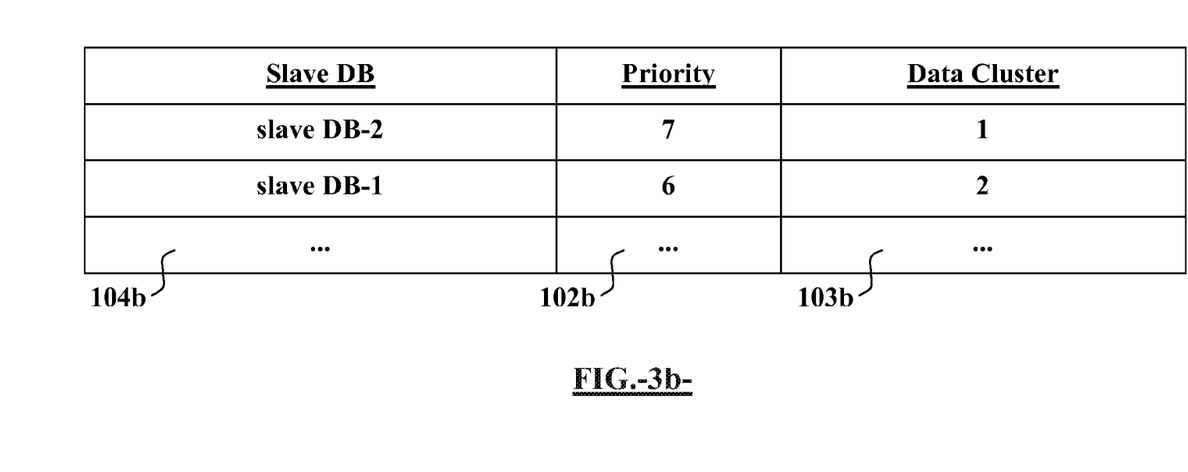
Figure 3C:
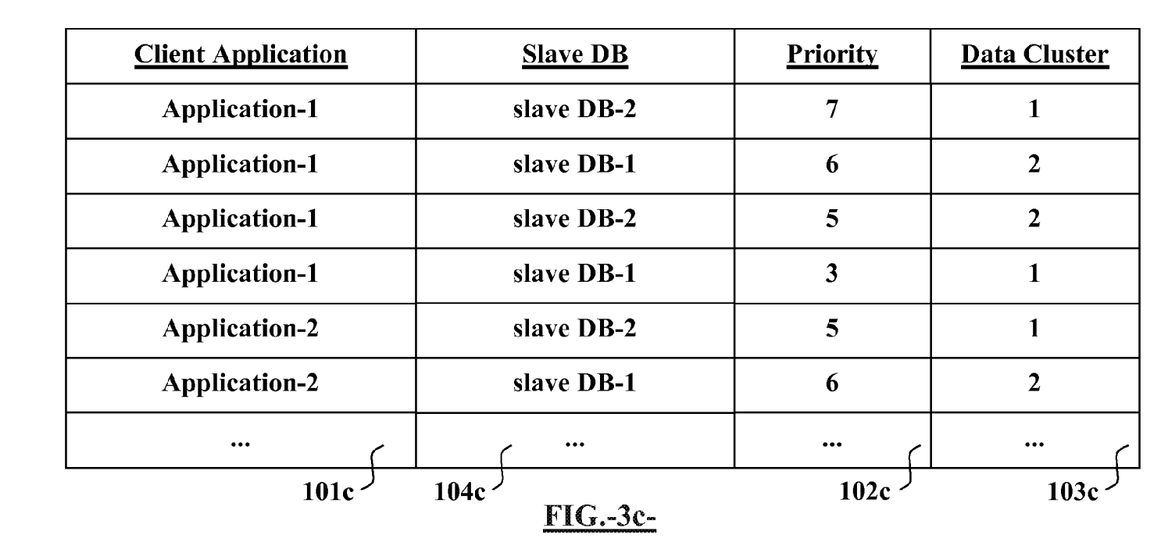

Therefore, this method includes an initial step of configuring data clusters at the master database 1, wherein each data cluster identifies a number of subscriber data associated with an operation and wherein each data cluster is assigned a priority per slave database, per application, or per combinations thereof. In this respect, FIG. 3a shows a first exemplary configuration wherein each exemplary data cluster 103a is assigned a priority 102a per each application 101a allowed to request execution of an operation to the database system; whereas FIG. 3b shows a second exemplary configuration wherein each exemplary data cluster 103b is assigned a priority 102b per each slave database 104b to act as memory cache; whereas FIG. 3c shows a third exemplary configuration wherein each exemplary data cluster 103c is assigned a priority 102c per each slave database 104c to act as memory cache and per each application 101c allowed to request execution of an operation to the database system.

To this end, as FIG. 7 illustrates, the master database 1 includes a configuration unit 10 for configuring data clusters 103a, 103b, 103c, wherein each data cluster identifies a number of subscriber data associated with an operation and is assigned a priority 102a, 102b, 102c per slave database 104b, application 101a, or combinations thereof 101c, 104c; and also a memory module 11 for storing data cluster values per subscriber basis.

Figure 5:
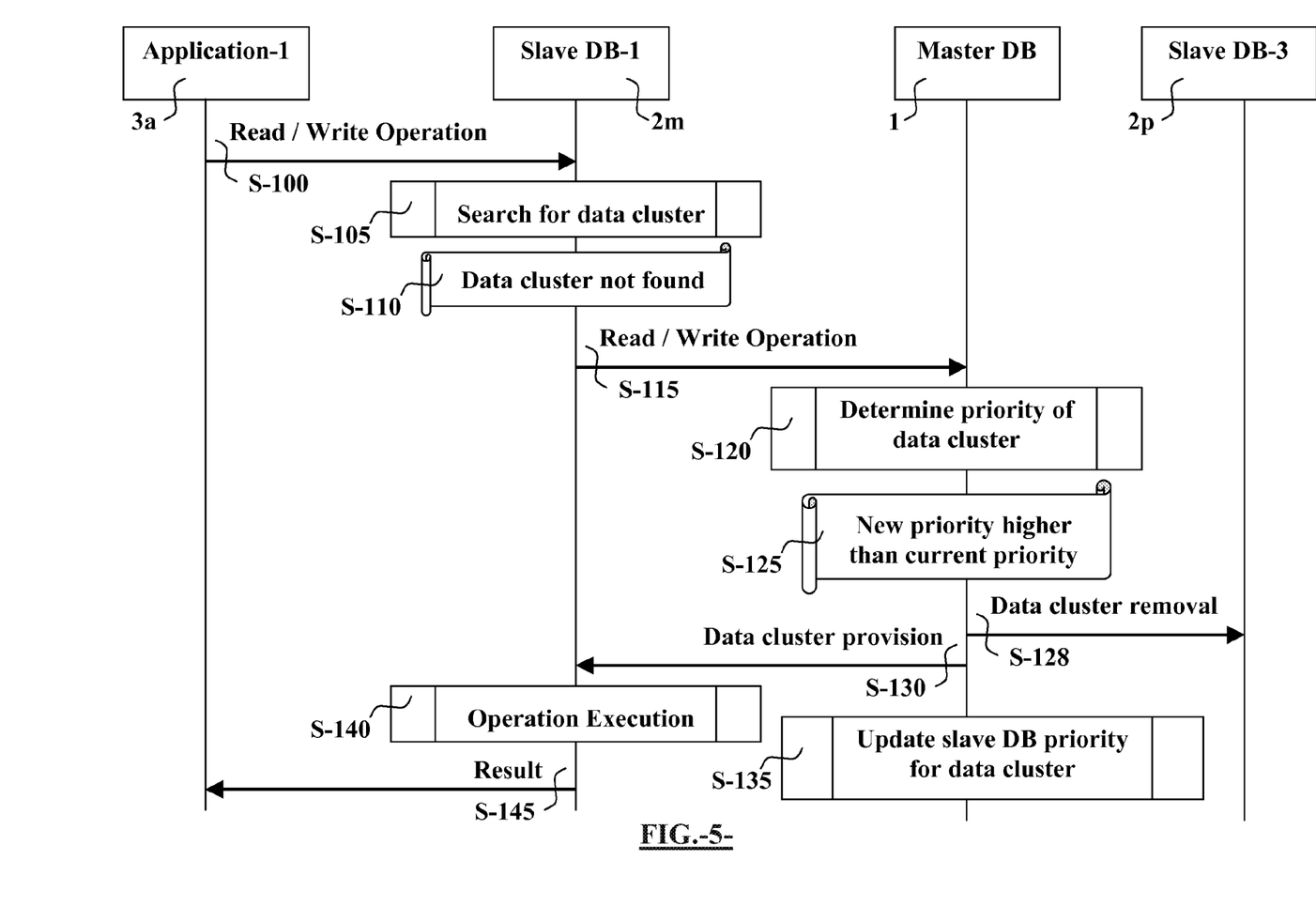
FIG. 5 is a basic sequence diagram illustrating the retrieval of a data cluster for executing an operation request at a slave database where the priority of the operation is higher than for previous operations.

Once data clusters are configured in the master database 1, the FIG. 5 illustrates a basic sequence of actions carried out in accordance with a first embodiment of the method wherein an operation associated with a high-priority data cluster is requested to the database system during a step S-100. Such operation is referred to, for the sake of simplicity, as a "Read/Write Operation" to indicate that the data cluster values might be modified as a result of executing a 'write operation', and are not modified as a result of executing a 'read operation'. Nevertheless, these operations may always require a process rather than a simple read or write instruction in order to produce a result.

In this first embodiment, the operation for a given subscriber is submitted from a first application 3a, namely Application-1, during the step S-100 and is received at first slave database 2m, namely Slave DB-1. Generally speaking, the database system may have a common receiver for receiving operations from the applications. However, in accordance with an advantageous embodiment, this step S-100 of receiving the operation request for a given subscriber is carried out at a slave database 2m, which is connected with the first application 3a. To this end, as FIG. 7 illustrates, the slave database 2m may include a receiver 21 arranged for receiving the operation request for a given subscriber from the application 3a.

In this first embodiment illustrated in FIG. 5, the slave database 2m receiving the operation searches during a step S-105 whether a data cluster associated with the received operation exists at the slave database, and determines during a step S-110 that no such data cluster exists therein. Such data cluster is not replicated at the slave database 2m and actions are required from the master database 1 to obtain an execution result to be returned towards the requester application. To this end, as FIG. 7 illustrates, the slave database 2m includes a memory module 20 for replicating a number of data clusters from the master database 1, and a processing unit 22 arranged for determining whether a data cluster associated with the operation exists in the memory module at the slave database.

In this respect, the method may further include a step S-115 of sending the operation request for the given subscriber from the slave database 2m towards the master database 1, as FIG. 5 illustrates. Alternatively or complementary, and not illustrated in any drawing, the method may include a step of configuring data clusters at the slave database 2m, each data cluster identifying a number of subscriber data associated with the operation and, additionally, a step of requesting the data cluster associated with the operation request for the given subscriber from the slave database 2m towards the master database 1. To this end, as FIG. 7 illustrates, the slave database 2m may include a sender 23 for sending the operation request for the given subscriber towards the master database 1, and the master database 1 may further include a receiver 14 for receiving said operation request. Alternatively or complementary, the slave database 2m may include a configuration unit 24 for configuring data clusters at the slave database 2m, wherein each data cluster identifies a number of subscriber data associated with the operation and, additionally, the slave database 2m may include a sender 23 for requesting a data cluster associated with the operation request for the given subscriber towards the master database 1.

Whatever previous alternative is followed, the method illustrated in FIG. 5 continues with a step S-120 of determining at the master database 1 the priority of the data cluster associated with the operation. To this end, as FIG. 7 illustrates, the master database 1 includes a processing unit 12 for determining the priority of the data cluster associated with the operation. This may be achieved by consulting any table built up as the exemplary tables in FIG. 3a, 3b, or 3c, or the like.

In this case illustrated in FIG. 5, the processing unit 12 determines during a step S-125 that the priority of the data cluster associated with this new operation is higher than for previous operations, if any, and triggers the replication of the data cluster towards the slave database currently in charge of the operation. Thus, the method includes a step S-130 of providing the data cluster associated with the operation from the master database 1 towards the slave database 2m, a step of replicating the received data cluster at the slave database 2m, and a step S-140 of executing the operation with the received data cluster at the slave database 2m. To this end, as FIG. 7 illustrates, the master database 1 includes a sender 13 for providing the data cluster associated with the operation towards the slave database 2m where the priority of the data cluster is higher than for previous operation; whereas the receiver 21 of the slave database 2m is arranged for receiving the data cluster associated with the operation from the master database 1, and the processing unit 22 of the slave database 2m is arranged for executing the operation with the received data cluster.

Particular applicable in this case, where the data cluster is modified at the slave database 2m as a result of executing the operation during the step S-140, the method may include a step of updating the master database 1 with modified data cluster values. To this end, as FIG. 7 illustrates, the processing unit 22 in cooperation with the sender 23 of the slave database 2m is arranged for submitting an update towards the master database 1 with modified data cluster values, where the received data cluster is modified as a result of executing the operation, and the processing unit 12 of the master database 1 in cooperation with the receiver 14 is arranged for updating said data cluster in the memory module 11.

Figure 4:
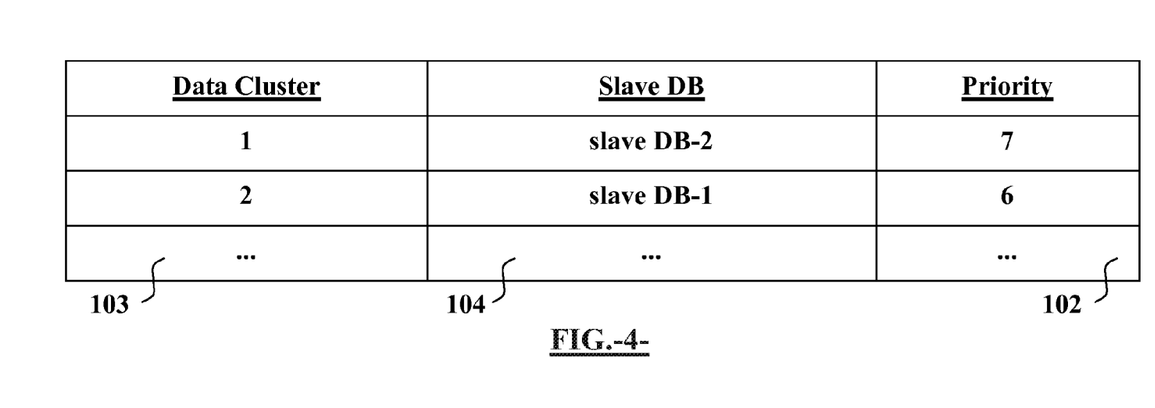
FIG. 4 illustrates an exemplary table held at the master database of the database system, and dynamically updated during operation, to indicate those particular data clusters replicated in given slave databases and having a given priority.

Once the data cluster has been submitted for replication at the slave database, the master database may update during a step S-135 a dynamic table, such as the exemplary one shown in FIG. 4, to track in what particular slave database 104 a particular data cluster 103 is replicated and with what priority was submitted there. This update may be done by the processing unit 12 of the master database 1, likely acting on the memory module 11 therein.

In particular, where the data cluster associated with the new operation had been previously replicated in another slave database 2p, namely Slave DB-3, and the priority of the data cluster at the another slave database 2p is lower than for the new operation, the method may include a step S-128 of instructing the another slave database 2p the removal of a data cluster. To this end, as FIG. 7 illustrates, the processing unit 12 of the master database 1 in cooperation with the sender 13 is arranged for instructing a slave database 2p the removal of a data cluster where the priority of the data cluster at the slave database 2p is lower than for a new operation, and the processing unit 22 of the slave database 2p in cooperation with the receiver 21 is arranged for removing said data cluster from the memory module 20.

As already commented above, the method may be enhanced with an additional mechanism to dynamically update the priority assigned to data clusters during the step of configuration. This update may be based on accountability of successful, or unsuccessful, movements of the data cluster from one slave database to one another, and reaching a predefined threshold value for the successful or unsuccessful movement. For instance, in the present embodiment, the method may include a step of increasing a so-called 'successful counter' for the priority assigned to the data cluster submitted to the slave database 2m, or a step of decreasing the 'unsuccessful counter' for the priority assigned to the data cluster withdrawn from the slave database 2p, or both, until reaching a predefined threshold high-value or low-value, where the corresponding assigned priority is increased or decreased. To this end, as FIG. 7 illustrates, the processing unit 12 of the master database 1 in cooperation with the configuration unit 10, the memory module 11 or both, is arranged for dynamically updating the priority assigned to the data cluster, the update based on accountability of successful or unsuccessful movements of the data cluster from one slave database to one another and reaching a predefined threshold value for the successful or unsuccessful movement.

The method, in accordance with the embodiment illustrated in FIG. 5, ends with a step S-145 of returning the execution result towards the requester application 3a. In this first embodiment, aligned with the reception at the slave database 2m of the operation for a given subscriber from the application 3a, the step S-145 of returning the execution result towards the requester application 3a may be carried out at the slave database 2m, which is connected with the application 3a. Generally speaking, the database system may have a common sender for returning execution results towards the applications. However, in accordance with this advantageous embodiment, as FIG. 7 illustrates, the slave database 2m includes a sender 23 for returning the execution result towards the requester application 3a.

Figure 6:
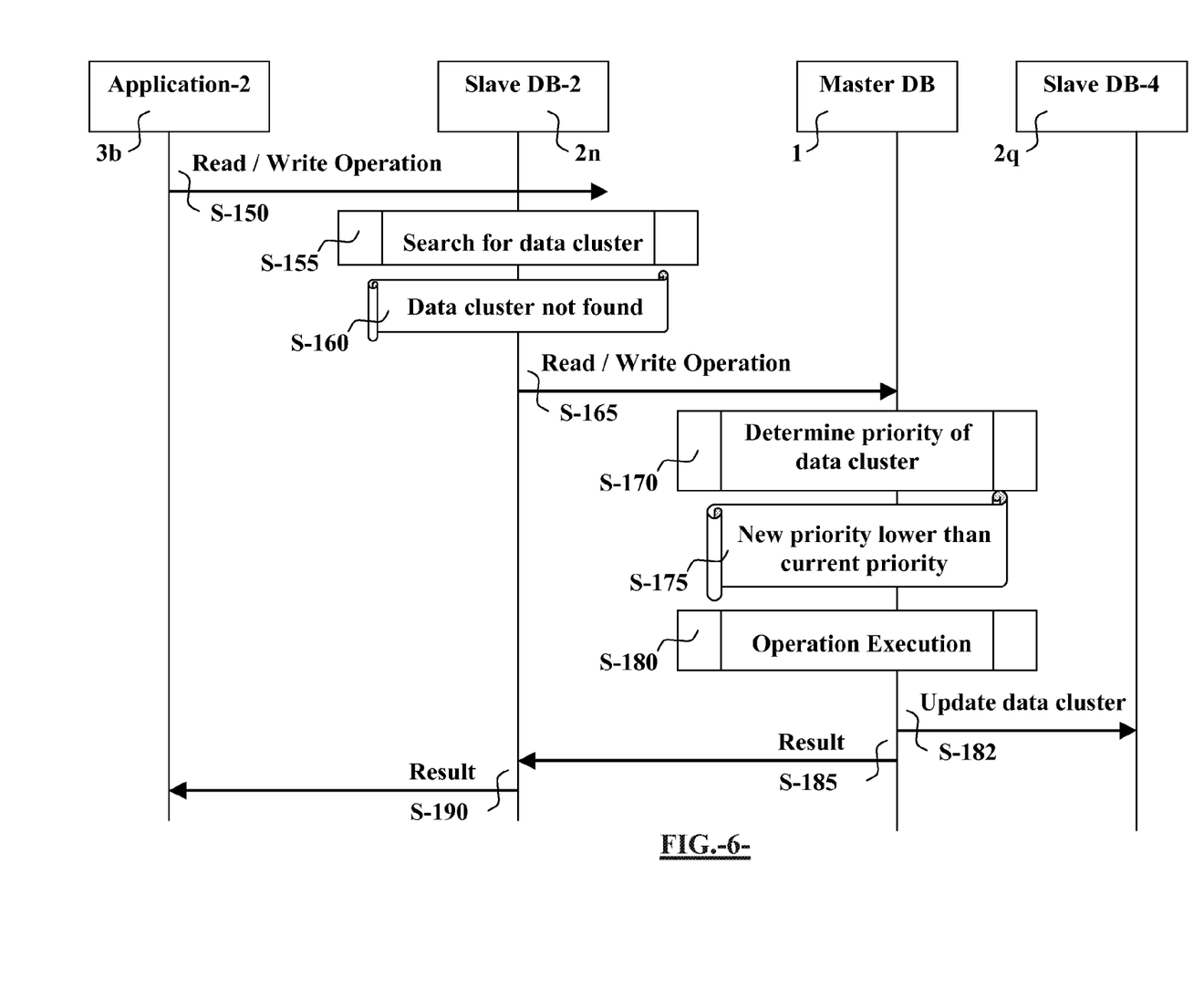
FIG. 6 is a basic sequence diagram illustrating the execution of an operation request at the master database where the priority of a new operation is lower than for a current operation.

A second embodiment of this method is illustrated in FIG. 6. Once data clusters have been configured in the master database 1, as for the above first embodiment, the FIG. 6 illustrates a basic sequence of actions carried out in accordance with this second embodiment of the method wherein an operation associated with a low-priority data cluster is requested to the database system during a step S-150. As before and for the same purpose, such operation is referred to as a "Read/Write Operation", and may always require a process rather than a simple read or write instruction in order to produce a result.

This second embodiment has quite a few actions in common with the above first embodiment and, for the sake of simplicity, those particular or alternative features for the common actions, which are enough detailed for the first embodiment, may be partially or totally omitted for this second embodiment without any intention of departing from the above description.

In this second embodiment, the operation for a given subscriber is submitted from a first application 3b, namely Application-2, during the step S-150 and is received at a second slave database 2n, namely Slave DB-2. As for the previous embodiment, the database system may have a common receiver for receiving operations from the applications. However, in accordance with an advantageous embodiment, this step S-150 of receiving the operation request for a given subscriber is carried out at the slave database 2n, which is connected with the second application 3b. To this end, as FIG. 7 illustrates, the slave database 2n may include a receiver 21 arranged for receiving the operation request for a given subscriber from the application 3b.

In this second embodiment illustrated in FIG. 6, the slave database 2n receiving the operation searches during a step S-155 whether a data cluster associated with the received operation exists at the slave database, and determines during a step S-160 that no such data cluster exists therein. Such data cluster is not replicated at the slave database 2n and actions are required from the master database 1 to obtain an execution result to be returned towards the requester application. To this end, as FIG. 7 illustrates, the slave database 2n includes a memory module 20 for replicating a number of data clusters from the master database 1, and a processing unit 22 arranged for determining whether a data cluster associated with the operation exists in the memory module at the slave database.

In this respect and as for the first embodiment, the method may further include a step S-165 of sending the operation request for the given subscriber from the slave database 2n towards the master database 1, as FIG. 6 illustrates. Alternatively or complementary, and not illustrated in any drawing, the method may include a step of configuring data clusters at the slave database 2n, each data cluster identifying a number of subscriber data associated with the operation and, additionally, a step of requesting the data cluster associated with the operation request for the given subscriber from the slave database 2n towards the master database 1. To this end, as FIG. 7 illustrates, the slave database 2n may include a sender 23 for sending the operation request for the given subscriber towards the master database 1, and the master database 1 may further include a receiver 14 for receiving said operation request. Alternatively or complementary, the slave database 2n may include a configuration unit 24 for configuring data clusters at the slave database 2n, wherein each data cluster identifies a number of subscriber data associated with the operation and, additionally, the slave database 2n may include a sender 23 for requesting a data cluster associated with the operation for the given subscriber towards the master database 1.

Whatever previous alternative is followed, the method illustrated in FIG. 6 continues with a step S-170 of determining at the master database 1 the priority of the data cluster associated with the operation. To this end, as FIG. 7 illustrates, the master database 1 includes a processing unit 12 for determining the priority of the data cluster associated with the operation. This may be achieved by consulting any table built up as the exemplary tables in FIG. 3a, 3b, or 3c, or the like.

In this case illustrated in FIG. 6, the processing unit 12 determines during a step S-175 that the priority of the data cluster associated with this new operation is lower than for a previous operation, and triggers the execution of the operation at the master database 1, and with the data cluster therein, during a step S-180. To this end, as FIG. 7 illustrates, the processing unit 12 of the master database 1 is arranged for executing the operation with the data cluster where the priority of the data cluster is lower than for a previous operation.

In particular, where the data cluster is modified as a result of executing the operation during the step S-180, the method may include a step of locally updating the master database 1 with modified data cluster values. Moreover, where the modified data cluster associated with the new operation had been previously replicated in another slave database 2q, namely Slave DB-4, and the priority of the data cluster at the another slave database 2q is higher than for the new operation, the method may include a step S-182 of updating the another slave database 2q with modified data cluster values. To this end, as FIG. 7 illustrates, the processing unit 12 of the master database 1 in cooperation with the sender 13 is arranged for submitting an update towards the another slave database 2q with modified data cluster values, where the data clusters are modified at the master database 1, and the processing unit 22 of the slave database 2q in cooperation with the receiver 21 is arranged for updating said data cluster in the memory module 20.

The method, in accordance with the second embodiment illustrated in FIG. 6, ends with a step of returning the execution result towards the requester application 3b. In particular, the method may include a step S-190 of returning the execution result towards the requester application 3b from the slave database 2n, which is connected with the application 3b.

Generally speaking, the database system may have a common sender for returning execution results towards the applications. However, in this second embodiment illustrated in FIG. 6, this step of returning the execution result towards the requester application may include a step S-185 of returning the result from the master database 1 to the slave database 2n and a step S-190 of returning the result from the slave database 2n towards the requester application 3b.

To this end, as FIG. 7 illustrates, the slave database 2n may include a sender 23 arranged for returning the execution result towards the requester application 3b. In particular, the sender 13 of the master database 1 may be arranged for returning the execution result towards the slave database 2n, the receiver 21 of the slave database 2n may be arranged for receiving said result, and the sender 23 of the slave database 2n may be arranged for returning said result towards the requester application 3b.

The method, under the first or second embodiments respectively illustrated in FIG. 5 and FIG. 6 or combinations thereof, may be applicable in a database system having a unique centralized master database, as shown in FIG. 1, as well as in a database system wherein the master database comprises a plurality of interconnected cooperating databases, as shown in FIG. 2. For the latter, the method may further comprise a step of determining a first cooperating database 1e in charge of the data cluster, and a step of providing either the data cluster or the result of executing the operation towards a slave database 2m, 2n through a second cooperating database 1a, 1c. To this end, this database system may be provided with an arrangement 1 having a unique centralized master database as well as with an arrangement 1 having a plurality of interconnected cooperating databases 1a, 1b, 1c, 1d, 1e where data clusters may be distributed. In the latter arrangement, the sender 13 of each cooperating database may be arranged for providing either the data cluster or the result of executing the operation towards the slave database 2m, 2n, 2p, 2q directly of through another cooperating database.

As already disclosed above, the database system and the method, under the first or second embodiments or combinations thereof, are usable in a so-called data layered architecture wherein a number of front-end servers, which are arranged to provide external communications towards other entities in a telecommunication network, share the database system.

A first instance of an entity in a data layer architecture may be a HLR holding subscriber data for subscribers of a GSM network, wherein the HLR comprises a front-end server for external communications and the above database system for storing the subscriber data for said subscribers.

A second instance of an entity in a data layer architecture may be a HSS holding subscriber data for subscribers of an IMS network, wherein the HSS comprises a front-end server for external communications and the above database system for storing the subscriber data for said subscribers.

The technology disclosed herein also provides for a computer program, loadable into an internal memory of a computer with input and output units as well as with a processing unit, the computer program comprising executable software adapted to carry out method steps as described above when running in the computer, and wherein the executable software may be recorded in a carrier readable in a computer.

The technology disclosed herein is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method of handling subscriber data in a database system comprising a master database and a plurality of slave databases to act as memory caches, each slave database connected with a number of applications allowed to request execution of operations to the database system, the method comprising:

configuring data clusters at the master database, wherein each data cluster identifies subscriber data associated with an operation and is associated with said operation, and wherein each data cluster is assigned a priority per slave database basis, per application basis, or per combination of slave database and application basis;

receiving at a slave database an operation request for a requested operation for a given subscriber from a requester application connected with the slave database;

sending the operation request for the requested operation from the slave database to the master database;

determining at the master database a data cluster associated with the requested operation, and the priority assigned to the data cluster as configured for at least one of the requester application and the slave database;

when the priority of the data cluster associated with the requested operation is higher than priorities for previous requested operations associated with the data cluster, providing the data cluster associated with the requested operation from the master database to the slave database, replicating the provided data cluster at the slave database, and executing the requested operation with the provided data cluster at the slave database;

when the priority of the data cluster associated with the requested operation is lower than priority for a previous requested operation associated with the data cluster, executing the requested operation with the data cluster associated with the requested operation at the master database; and, returning the execution result towards the requester application.

2. The method of claim 1, wherein returning the execution result towards the requester application is carried out at a slave database connected with the application, 3. The method of claim 1, further comprising determining that no data cluster associated with the requested operation exists at the slave database.

4. The method of claim 1, further comprising configuring data clusters at the slave database, each data cluster identifying the subscriber data associated with the operation.

5. The method of claim 4, further comprising requesting a data cluster associated with the requested operation for the given subscriber from the slave database to the master database.

6. The method of claim 1, wherein returning the result towards the requester application includes returning the result from the master database to the slave database and returning the result from the slave database to the requester application.

7. The method of claim 1, further comprising instructing the removal of the data cluster associated with the requested operation from another slave database where the priority of the data cluster for the another slave database is lower than for the slave database executing the requested operation.

8. The method of claim 1, wherein executing the requested operation with the provided data cluster at the slave database includes updating the master database where the data cluster associated with the requested operation is modified as a result of executing the operation.

9. The method of claim 1, wherein executing the requested operation with the data cluster associated with the requested operation at the master database includes updating another slave database with modified data cluster values where the data cluster associated with the requested operation is modified as a result of executing the operation, and where the priority of the data cluster associated with the requested operation for the another slave database is higher than for the slave database receiving the operation request for the requested operation.

10. The method of claim 1, wherein the master database includes a plurality of interconnected cooperating databases, and further comprising:
   determining a first cooperating database in charge of the data cluster; and
   providing either the data cluster associated with the requested operation or the result of executing the operation towards a slave database through a second cooperating database.

11. The method of claim 1, further comprising:
   determining successful or unsuccessful movements of the data cluster associated with the requested operation from one slave database to one another; and
   upon reaching a predefined threshold value for a number of successful or unsuccessful movements, dynamically updating the priority assigned to the data cluster associated with the requested operation.

12. A database system storing subscriber data for subscribers of a telecommunication network, the database system comprising:
   a master database;
   a plurality of slave databases configured to act as memory caches, each slave database connected with a number of applications allowed to request execution of one or more operations to the database system; and
   a sender for returning an execution result to a requester application;
   wherein the master database includes:
      a configuration unit for configuring data clusters, wherein each data cluster identifies subscriber data associated with an operation and is associated with said operation, and wherein each data cluster is assigned a priority per slave database basis, per application, or per combination database and application basis;
      a memory module configured to store data cluster values per subscriber basis;
      a receiver for receiving from a slave database an operation request from a request application for a requested operation for a given subscriber;
      a processing unit configured to determine a data cluster associated with the requested operation, and the priority assigned to data cluster as configured for at least one of the requester application and the slave database, and to execute the requested operation with the data cluster associated with the requested operation when the priority of the data duster is lower than priority for a previous requested operation associate with the data cluster; and
      a sender configured to provide the data cluster associated with the requested operation to the slave database when the priority of the data cluster is higher than priorities for previous requested operations associated with the data cluster; and
   wherein each slave database includes:
      a memory module for replicating a number of data dusters from the master database;
      a receiver for receiving the operation request for the requested operation for a given subscriber from the requester application, and for receiving the data cluster associated with the requested operation from the master database;
      a sender for sending the operation requested from the requester application for the requested operation for the given subscriber to the master database; and
      a processing unit for executing the requested operation with the received data cluster.

13. The database system of claim 12, wherein the processing unit of each slave database is arranged for determining whether a data cluster associated with the requested operation exists in the memory module at the slave database.

14. The database system of claim 12, wherein each slave database includes a sender for returning the execution result to the requester application.

15. The database system of claim 12, wherein each slave database includes a configuration unit for configuring data clusters at the slave database, wherein each data cluster identifies the subscriber data associated with the requested operation and is associated with said requested operation.

16. The database system of claim 15, wherein each slave database includes a sender configured to request a data cluster associated with the requested operation for the given subscriber to the master database.

17. The database system of claim 14, wherein the sender of the master database is arranged for returning the execution result towards the requester application through the slave database, the receiver of the slave database is arranged for receiving said result, and the sender of the slave database is arranged for returning said result to the requester application.

18. The database system of claim 12, wherein the processing unit of the master database in cooperation with the sender is arranged for instructing the removal of a data cluster associated with the requested operation from another slave database where the priority of the data cluster associated with the requested operation for the another slave database is lower than the slave database executing the requested operation, and wherein the processing unit of the another slave database in cooperation with the receiver is arranged for removing said data cluster associated with the requested operation from the memory module.

19. The database system of claim 12, wherein the processing unit in cooperation with a sender of each slave database is arranged for submitting an update to the master database where the received data cluster is modified as a result of executing the requested operation, and wherein the processing unit of the master database in cooperation with the receiver is arranged for updating said data duster associated with the requested operation in the memory module.

20. The database system of claim 12, wherein the processing unit of the master database in cooperation with the sender is arranged for submitting an update to a slave database where the data cluster is modified at the master database as a result of executing the requested operation, and wherein the processing unit of each slave database in cooperation with the receiver is arranged for updating said data cluster in the memory module.

21. The database system of claim 12, wherein the master database includes a plurality of interconnected cooperating databases where data clusters are distributed, the sender of each cooperating database being arranged for providing either the data cluster associated with the requested operation or the result of executing the operation towards the slave database directly or through another cooperating database.

22. The database system of claim 12, wherein the processing unit of the master database in cooperation with the configuration unit is arranged for:
 determining successful or unsuccessful movements of the data cluster associated with the requested operation from one slave database to another; and
 upon reaching a predefined threshold value for a number of successful or unsuccessful movements, dynamically updating the priority assigned to the data cluster associated with the requested operation.

23. A Home Location Register system configured to hold subscriber data for subscribers of a $2^{nd}$ generation cellular network, the system comprising:
 a front-end server for external communications; and
 the database system of claim 12 for storing the subscriber data for said subscribers.

24. A Home Subscriber Server system configured to hold subscriber data for subscribers of an IP Multimedia Subsystem "IMS" network, the system comprising:
 a front-end server for external communications; and
 the database system of claim 12 for storing the subscriber data for said subscribers.

25. A non-transient computer-readable memory comprising instructions which, when executed by a processor, perform the method of claim 1.

\* \* \* \* \*

UNITED STATES PATENT AND TRADEMARK OFFICE
CERTIFICATE OF CORRECTION

PATENT NO.         : 8,818,942 B2
APPLICATION NO.    : 12/670198
DATED              : August 26, 2014
INVENTOR(S)        : Escribano Bullon et al.

It is certified that error appears in the above-identified patent and that said Letters Patent is hereby corrected as shown below:

In the specification

Column 5, Line 57, delete "of" and insert -- or --, therefor.

Column 12, Line 2, delete "of" and insert -- or --, therefor.

In the claims

Column 13, Line 8, Claim 2, delete "application," and insert -- application. --, therefor.

Column 14, Lines 8-9, Claim 12, delete "application, or per combination" and insert -- application basis, or per combination of slave --, therefor.

Column 14, Line 18, Claim 12, delete "to" and insert -- to the --, therefor.

Column 14, Line 22, Claim 12, delete "duster" and insert -- cluster --, therefor.

Column 14, Line 23, Claim 12, delete "associate" and insert -- associated --, therefor.

Column 14, Line 30, Claim 12, delete "dusters" and insert -- clusters --, therefor.

Column 14, Line 37, Claim 12, delete "requested" and insert -- request --, therefor.

Column 15, Line 3, Claim 18, delete "than" and insert -- than for --, therefor.

Column 15, Line 14, Claim 19, delete "duster" and insert -- cluster --, therefor.

Signed and Sealed this
Twenty-eighth Day of April, 2015

Michelle K. Lee
*Director of the United States Patent and Trademark Office*